(12) United States Patent
Nunnelee

(10) Patent No.: US 6,758,098 B1
(45) Date of Patent: Jul. 6, 2004

(54) FORCE-MEASURING CLAMP

(75) Inventor: Mark Nunnelee, Tehachapi, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 344 days.

(21) Appl. No.: 10/084,747

(22) Filed: Feb. 20, 2002

(51) Int. Cl.$^7$ .............................................. G01N 3/00
(52) U.S. Cl. .............................. 73/760; 73/761; 73/856; 269/217
(58) Field of Search ................... 73/760–764, 855–860; 269/217

(56) References Cited

U.S. PATENT DOCUMENTS

| | | | |
|---|---|---|---|
| 3,535,937 A | 10/1970 | Wiggins et al. ............... 73/398 |
| 3,603,152 A | 9/1971 | Alibert et al. ............ 73/398 R |
| 3,750,475 A | 8/1973 | Weaver .................. 73/398 AR |
| 3,866,473 A | 2/1975 | Teitelbaum et al. ..... 73/398 AR |
| 3,898,885 A | 8/1975 | Russell .................. 73/398 AR |
| 3,965,745 A | 6/1976 | Carey .................... 73/398 AR |
| 4,066,082 A | 1/1978 | Arcan et al. ............ 128/303 R |
| 4,196,784 A | * 4/1980 | Suzuki et al. .......... 73/862.633 |
| 4,290,311 A | 9/1981 | Brewer ......................... 73/730 |
| 4,292,835 A | * 10/1981 | Bickford ..................... 73/1.15 |
| 4,549,355 A | 10/1985 | Sauer, deceased et al. . 33/148 H |
| 4,628,296 A | * 12/1986 | Kitagawa et al. ...... 73/862.623 |
| 4,646,563 A | 3/1987 | Jones .......................... 73/119 |
| 4,660,481 A | 4/1987 | Spickermann .............. 112/235 |
| 4,738,438 A | 4/1988 | Horie et al. ................. 269/136 |
| 4,911,004 A | 3/1990 | Leon ........................... 73/168 |
| 5,174,154 A | 12/1992 | Edwards ....................... 73/379 |
| 5,337,488 A | 8/1994 | Lemelson ..................... 33/784 |
| 5,435,477 A | 7/1995 | Torihata et al. .............. 228/4.5 |
| 5,467,656 A | 11/1995 | Teare et al. ............ 73/862.541 |
| 5,471,405 A | 11/1995 | Marsh ......................... 364/556 |
| 5,471,885 A | 12/1995 | Wagner ................. 73/862.041 |
| 5,501,107 A | 3/1996 | Snyder et al. ........... 73/862.23 |
| 5,649,934 A | 7/1997 | Smeltzer, III et al. ....... 606/122 |
| 5,666,964 A | 9/1997 | Meilus ........................ 128/744 |
| 5,895,084 A | 4/1999 | Mauro ........................ 294/100 |
| 5,904,639 A | 5/1999 | Smyser et al. ................ 482/91 |
| 5,938,182 A | 8/1999 | Goodrich et al. ........... 254/209 |
| 6,029,528 A | 2/2000 | Headley et al. ........ 73/862.541 |
| 6,045,517 A | 4/2000 | Williams ..................... 600/587 |

OTHER PUBLICATIONS

Datasheet for "INA125 Instrumentation Amplifier With Precision Voltage Reference," Texas Instruments, 1 page, from http://focus.ti.com/docs/prod/productfolder.jhtml?generic-PartNumber=INA125.
Product folder for INA125, Instrumentation Amplifier with Precision Voltage Reference, Texas Instruments, Burr–Brown Products, 17 pps., from http://focus.ti.com/docs/prod/folders/print/ina125.html.
"Micro–Measurements Strain Gage Accessories: M–Bond 610 Adhesive," 2pps., from http://www.vishay.com/brands/measurements_group/guide/a110/acc/mb610.htm.
"M–Bond AE–10, AE–15 and GA–2 Installations: Mixing Instructions and Adhesive Characteristics," 1 page, from http://www.vishay.com/brands/measurements_group/guide/ib/b137/137cl.htm.
"Stress, Strain, and Strain Gages," 9 pps., from http://www.me.psu.edu/me82/learning/strain/strain.html.

* cited by examiner

Primary Examiner—Edward Lefkowitz
Assistant Examiner—Alandra Ellington
(74) Attorney, Agent, or Firm—John H. Kusmiss

(57) ABSTRACT

A precision clamp accurately measures force over a wide range of conditions. Using a full bridge or other strain gage configuration, the elastic deformation of the clamp is measured or detected by the strain gages. The strain gages transmit a signal that corresponds to the degree of stress upon the clamp. The strain gage signal is converted to a numeric display. Calibration is achieved by zero and span potentiometers which enable accurate measurements by the force-measuring clamp.

21 Claims, 4 Drawing Sheets

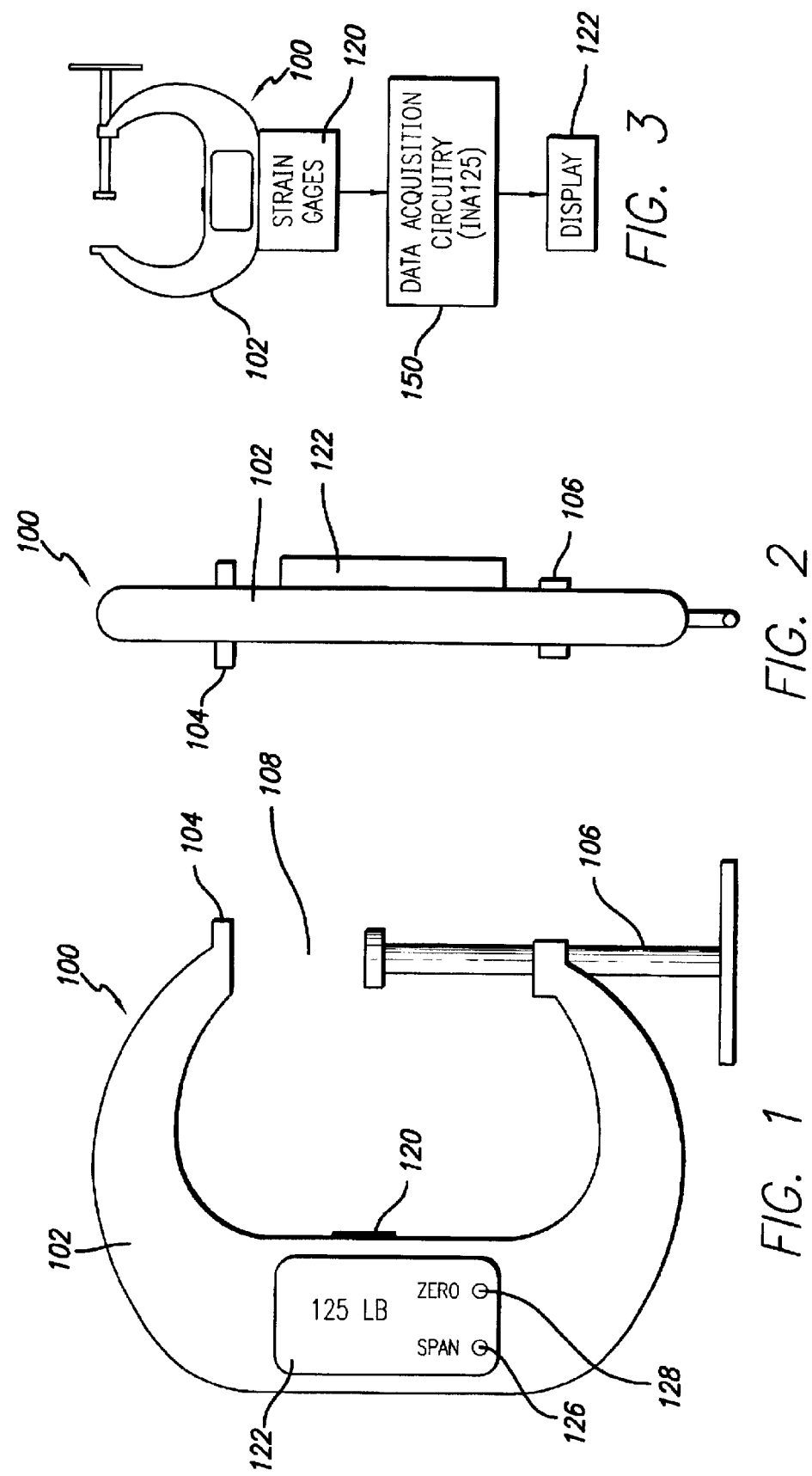

FORCE-MEASURING CLAMP

BACKGROUND OF THE INVENTION

1. Field of the Invention

This invention relates to force or pressure measuring devices, and more particularly to a clamp that measures force applied by the clamp with an improved degree of precision.

2. Description of the Related Art

The need for measuring the force or pressure while clamping two parts together or while bonding sensors to a substrate can be critical. Many parts and sensors are pressure sensitive and can fail under too much load. Many manufacturers of adhesives and sensors recommend a specific pressure (force) while bonding two parts together or while bonding a sensor to a substrate.

Making the actual measurement of the force being applied can be very cumbersome at best due to the need for additional load sensors and load indicating equipment. Prior methods for measuring the force were by use of load washers or miniature load cells in combination with load indicating equipment. Calibrated spring clamps have also been used. Load washers and miniature load cells add an additional part in the load path that can add to the destabilizing effect of the loading mechanism. Additionally, they require an external power source and load indicating equipment to obtain the force. Spring clamps can lose their calibration quickly by the weakening of the springs, and they are limited to the force that the spring can produce determined by its size.

Additionally, attempts have been made in the art to achieve force measure clamps with a varied degree of success.

U.S. Pat. No. 5,666,964 to Meilus is directed to a C-clamp type muscle treatment device that has a pressure measuring strain gage to record pressures at which the patient reports discomfort. A muscle clamping tool 10 in two embodiments shown in FIGS. 1 and 2 has a pair of opposed jaws 12 and 14 that can be brought together gradually for applying pressure to muscles. When pain is felt, a reading can be taken from the display 31 of the pressure read by the strain gage 30. Handle 18 is a quick release device that can instantly be activated to release the jaws.

U.S. Pat. No. 4,549,355 to Sauer, deceased, et al. is directed to a strain gage device for determining with accuracy the stem size of a plant without damaging it. Consequently, the strain gage device is acting as a micrometer rather than as a clamp. A dendrometer 10 includes a C-shaped transducer member 15 having a pair of elongate jaws 20, 21 for engaging a plant stem 12 with the jaw 21, having an adjustable connection 24 by means of an adjustment pole 25. Mounted on the transducer member 15 is a flexible transducer 14 comprising a bridge of strain gages R1–R4. When the stem changes in size, the changes in the relative amounts of tension or compression experienced by the strain gages can be interpreted to give an electronic indication of the diametrical size of stem 12.

U.S. Pat. No. 4,911,004 to Leon is directed to a portable clamp means in several embodiments that has strain gages that can determine axial loads on a cylindrical member that the clamp is applied to. The axial load on a cylindrical member 12 can be determined by the system that includes a C clamp device 10. The device includes a clamp means 14 and a strain gage sensor means 16 that together constitute a diametral strain-measuring device. The system includes a computation means 17 connected to the sensor means 16 and can include a storage and display means.

U.S. Pat. No. 3,535,937 to Wiggins et al. is directed to a pipe pressure measuring apparatus in the form of a C-shaped clamping means that has a plurality of strain gages for determining the pressure in a pipe by measuring the strain that results from the expansion of the pipe when under pressure. The apparatus 22, generally a U-shaped one-piece body, has inserts 30, 32 that are positioned in slots and face each other with curved inner surfaces that are complementary to the surface of the pipe being measured. A screw 54 threaded into a bore 50 provides a clamping means for the two inserts. Strain gages 70, 72, 74 are mounted on the body and connected to a strain indicator 84 which will provide a visible reading which can be translated into an internal pressure after suitable calibration of the apparatus.

U.S. Pat. No. 3,965,745 to Carey is directed to a pressure-responsive transducer that fits a fluid-carrying pipe or conduit and uses strain gages to determine the force and therefore, the pressure within the pipe. The housing element or yoke 11 has a slot 13 housing a ball bearing 15 and a pair of bolt-like members 25, 27 that adjustably position ball bearings 37, 39. A piezoelectric crystal 49 is secured to the housing element 11 so as to produce a voltage signal when the housing element 11 bends providing a signal in response to fluid surges in the conduit.

From the art, it can be seen that some prior clamps or force measuring devices seek to measure an initial force but generally do not seek to apply such force for clamping purposes. Consequently, such clamps cannot be used as clamps as for attaching one item to another by adhesive. While such prior art devices are clamp-like in shape, they do not perform the same compression functions as a clamp and the use of the term "clamps" in such devices indicates their appearance but not their operation as such devices do not clamp two things together with a selectable force or pressure.

SUMMARY OF THE INVENTION

The purpose of the force-measuring clamp of the present invention is to give the user a force indication or reading of the force being applied to the parts being clamped. The design of the force-measuring clamp is such that it can be implemented with almost any size clamp and measure almost any reasonable magnitude of force.

Preferably, a full bridge strain gage circuit is installed on a clamp and incorporates span and zero circuits with the output fed into a digital display. The strain gage is connected to the clamp and measures minute elastic deformities arising when the clamp applies force to an object. The design is simple, compact, and practical for many applications. Using a unique circuit design coupled with advanced engineering techniques, a precision clamp is achieved that allows the accurate application of force or pressure to a system such as two delicate electronic parts that are subject to compression while an adhesive sets.

OBJECTS OF THE INVENTION

It is an object of the present invention to provide a clamp that clamps or holds objects together or clamps or holds a single object.

It is another object of the present invention to provide a clamp that is capable of indicating the force that it is applying.

It is yet another object of the present invention to provide a clamp that is subject to calibration for both a non-loaded state (where no force is applied by the clamp), as well as a loaded state (where force is applied by the clamp).

It is yet another object of the present invention to provide a force-measuring clamp that is generally compact, easily calibrated, precise and accurate.

These and other objects and advantages of the present invention will be apparent from a review of the following specification and accompanying drawings.

BRIEF DESCRIPTION OF THE DRAWINGS

FIG. 1 is a side plan view of a force-measuring clamp according to the present invention.

FIG. 2 is a rear plan view of the force-measuring clamp of FIG. 1.

FIG. 3 is a schematic diagram indicating the circuit elements present in block structure in the force-measuring clamp of the present invention.

DESCRIPTION OF THE PREFERRED EMBODIMENT(S)

Figure 4:
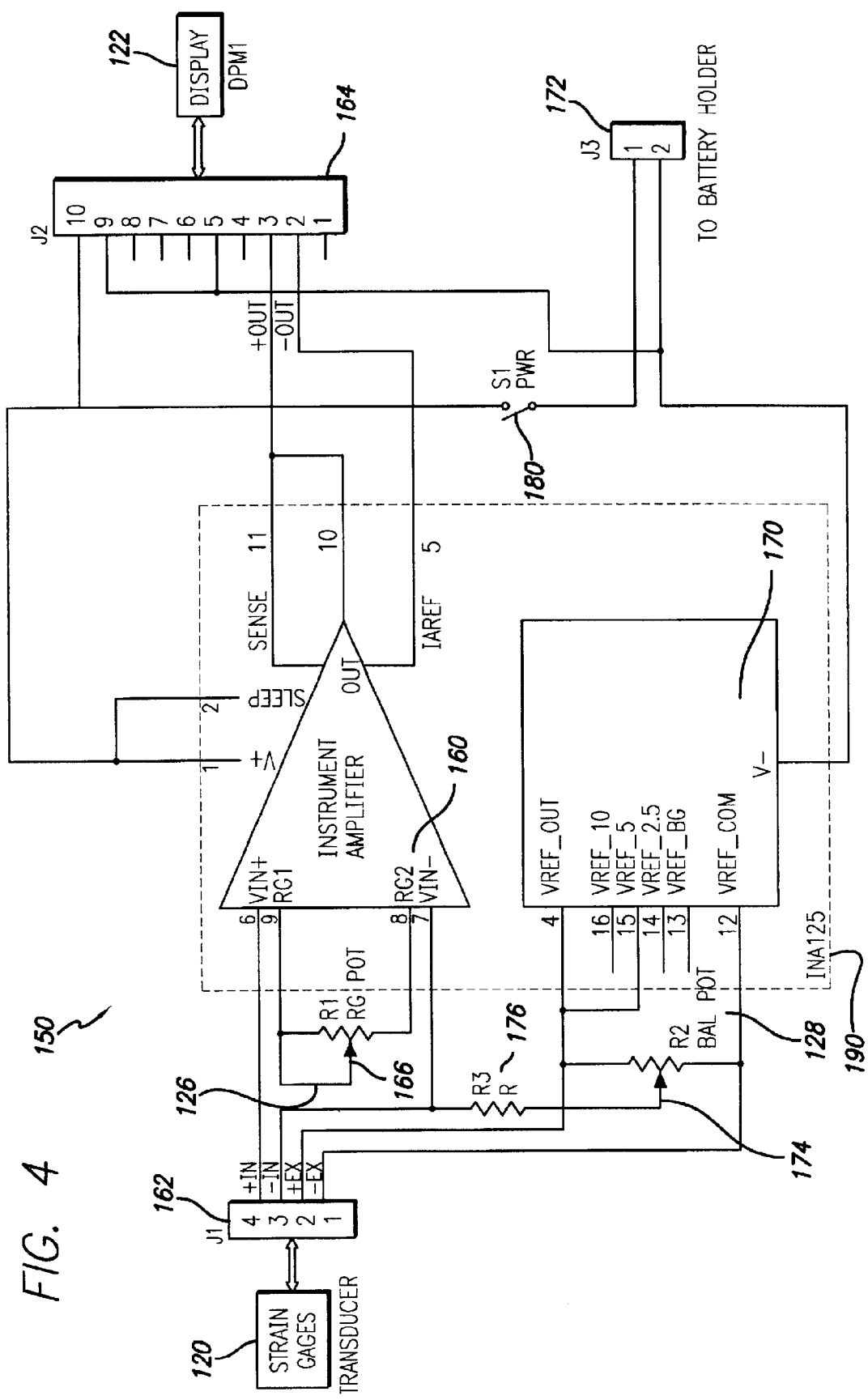
FIG. 4 is a circuit schematic of the data acquisition circuitry shown in FIG. 3 used to constructively modify and provide calibration for the signals transmitted by the strain gages to the display.

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The force-measuring clamp 100 may be a common C-clamp or any other kind of clamp that is meant to apply force or pressure in order to cause items to remain together as, for example, occurs during adhesive setting processes where one part is adhesively cemented or attached to another. Note should be taken that the present invention is a force-applying device that accurately measures the force being applied. This generally stands in contrast to force-measuring devices that are shaped in the configuration of a clamp. Generally, no actual clamping process or action occurs in such similar clamps. Instead, the clamp configuration is used in order to achieve force measurement rather than force application.

In a preferred embodiment, the force-measuring clamp 100 of the present invention has a stable or static base or chassis 102 ending in a base jaw 104. Oppositely opposed to the base jaw 104 is a selectably positional and adjustable jaw 106 which in the embodiment shown in FIGS. 1 and 2 is generally threadable upon the base 102. The item or items to be clamped are then positioned between the two jaws in the space 108 therebetween and the adjustable jaw 106 is then adjusted to compress the item in the jaw space 108.

When an item such as a workpiece object (not shown) is compressed by the jaws 104, 106, the strain gages 120 detect the elastic deformation of the base chassis 102. The strain gages are generally set forth in a well-known "T"-configuration where two of the strain gages are set in an axial position while two of the gages are set into a transverse position along the chassis in order to detect the tension or compression on the chassis 102. The strain gage bridge 120 is preferably a full bridge in order to provide greater sensitivity. As strain gage technology advances or according to different applications, different types of strain gages can be used in the place of the full bridge strain gage 120 contemplated in the present invention.

The strain gages 120 are coupled to a display 122 shown in FIGS. 1 and 2. Additionally, FIG. 1 shows span 126 and zero 128 adjustments that allow the present invention to provide not only precise measurements, but accurate measurements as well.

As shown in FIG. 3, the electronic or other signal components are shown in block diagram form coupled to the force-measuring clamp 100. Bonded or tightly attached to the chassis 120 (or in a preferred embodiment such as FIG. 1, inherently embedded into the metal or other material structure of the chassis 102) are the strain gages 120 that serve to detect the elastic deformation of the chassis 102. The strain gages 120 generate signals, which are then transmitted to and measured by data acquisition circuitry 150. The data acquisition circuitry 150 is shown in more detail (in one embodiment) in FIG. 4. A more detailed description of the data acquisition circuitry 150 is set forth below.

The data acquisition circuitry 150 then processes the data according to its calibrated settings and then transmits a signal representing a quantity of force on to the display 122. The signal is then converted into a numeric display so that the user of the force-measuring clamp 100 has a visual indication of a force measurement, indicating in an accurate manner the amount of force being applied by the clamp 100.

FIG. 4 shows an electronic schematic diagram of the data acquisition circuitry 150 used to both receive and transmit an indication of the state of the strain gages 120 to the display 122.

In FIG. 4, the strain gages 120 and the display 122 are shown as elements connected to the data acquisition circuitry 150. In the data acquisition circuitry, an amplifier 160 couples the strain gages 120 and the display 122 via a strain gage junction 162 and a display junction 164, respectively. The span adjustment 126 is shown in the form of a potentiometer that may be on the order of approximately fifty thousand ohms (50,000Ω). The span adjustment 126 allows the clamp 100 to be adjusted according to a measurable force as by a load washer or the like.

The wiper arm 166 of the span adjustment 126 is connected in a feedback manner between two inputs of the amplifier 160. This potentiometer adjusts the gain experienced by the amplifier 160 and serves to set the strain gage output signal for a known load such as that provided by a load washer or the like.

A reference voltage source 170 is generally coupled between a battery junction 172 and the strain gage junction 162. The reference source voltage (excitation module) 170 serves to provide a regulated steady-state voltage to the strain gages 120 via the strain gage junction 162. The reference source voltage is used as an improvement over batteries that generally provide less precise voltage. In the present case, an excitation voltage of approximately 5V is contemplated as providing advantageous utility and as shown in FIG. 4, the excitation voltage is wired to provide such a 5V voltage to the strain gages 120. The zero adjustment 128 is shown in the form of a potentiometer connected across a connection between ground and the five volt (5V) reference voltage. The zero adjustment may be a potentiometer having a maximum resistance of approximately fifty thousand ohms (50,000Ω) or as otherwise effective as known to those having skill in the art. The wiper arm 174 of the potentiometer 128 is coupled to a signal transmission line from the strain gage junction 162. In line with the wiper arm 174 of the zero potentiometer 128 is a resistor R3 176 that provides a current limiter for the zero adjustment 128. The value of R3 is generally 100 times the strain gage bridge 120 resistance.

A power switch 180 serves to supply power to the data acquisition circuitry 150. As indicated by the dashed box 190 circumscribing the amplifier 160 and the reference voltage source 170, this combination of components is currently known in the market as an INA125 chip and is a single monolithic circuit available commercially. This makes the data acquisition circuitry 150 very easy to construct and implement as the INA125 chip 190 needs then only to have the appropriate resistors, potentiometers, junctions, and switches added. Such tasks are generally within the scope of knowledge of those having ordinary skill in the art.

The purpose of the force-measuring clamp is to give the user a force indication or reading of the force being applied to the parts being clamped. The design of the force-measuring clamp is such that it can be implemented with almost any size clamp and measure almost any magnitude of force.

Figure 5:
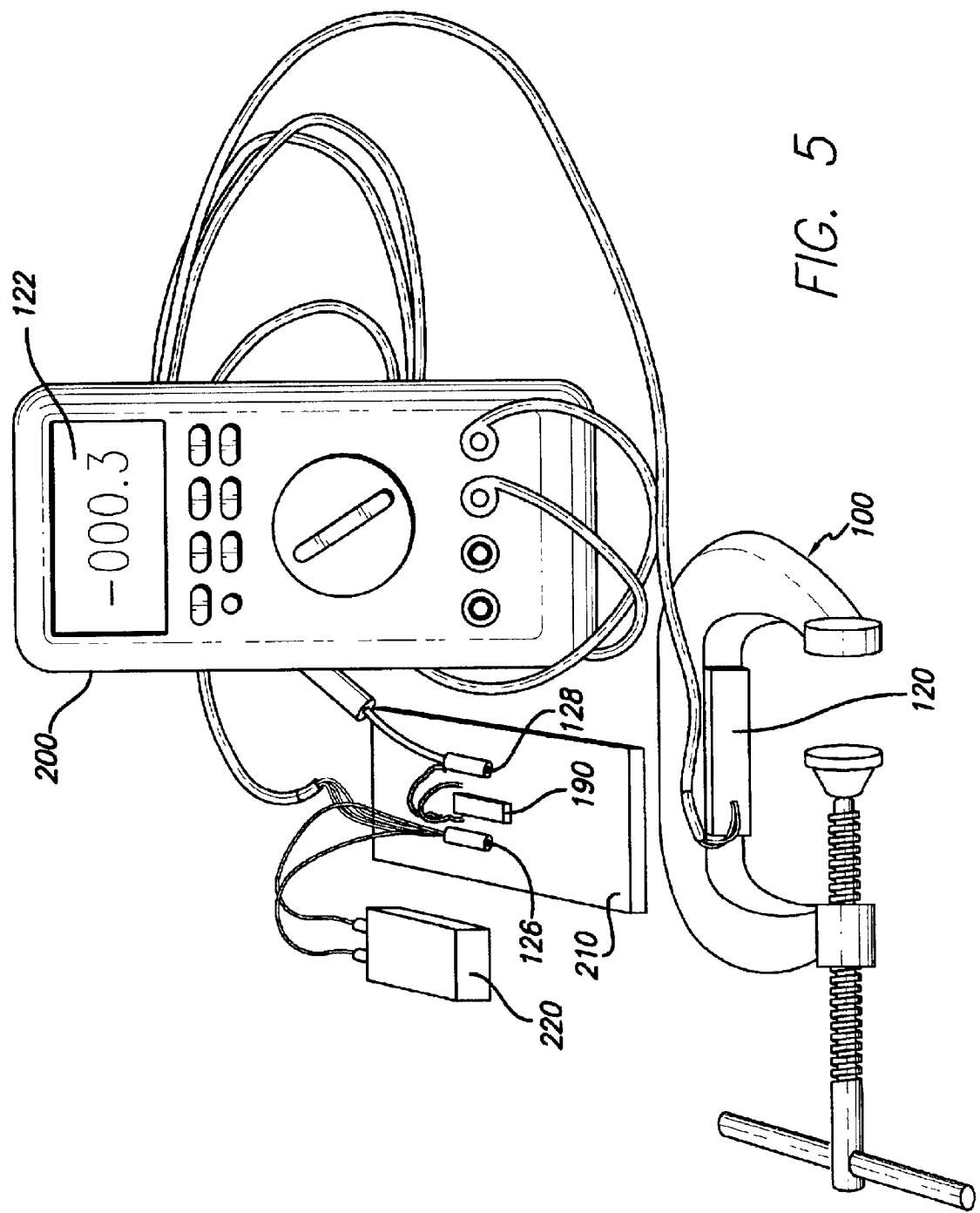
FIG. 5 is a plan view of a bench model of the present invention showing calibration for no load.
Figure 6:
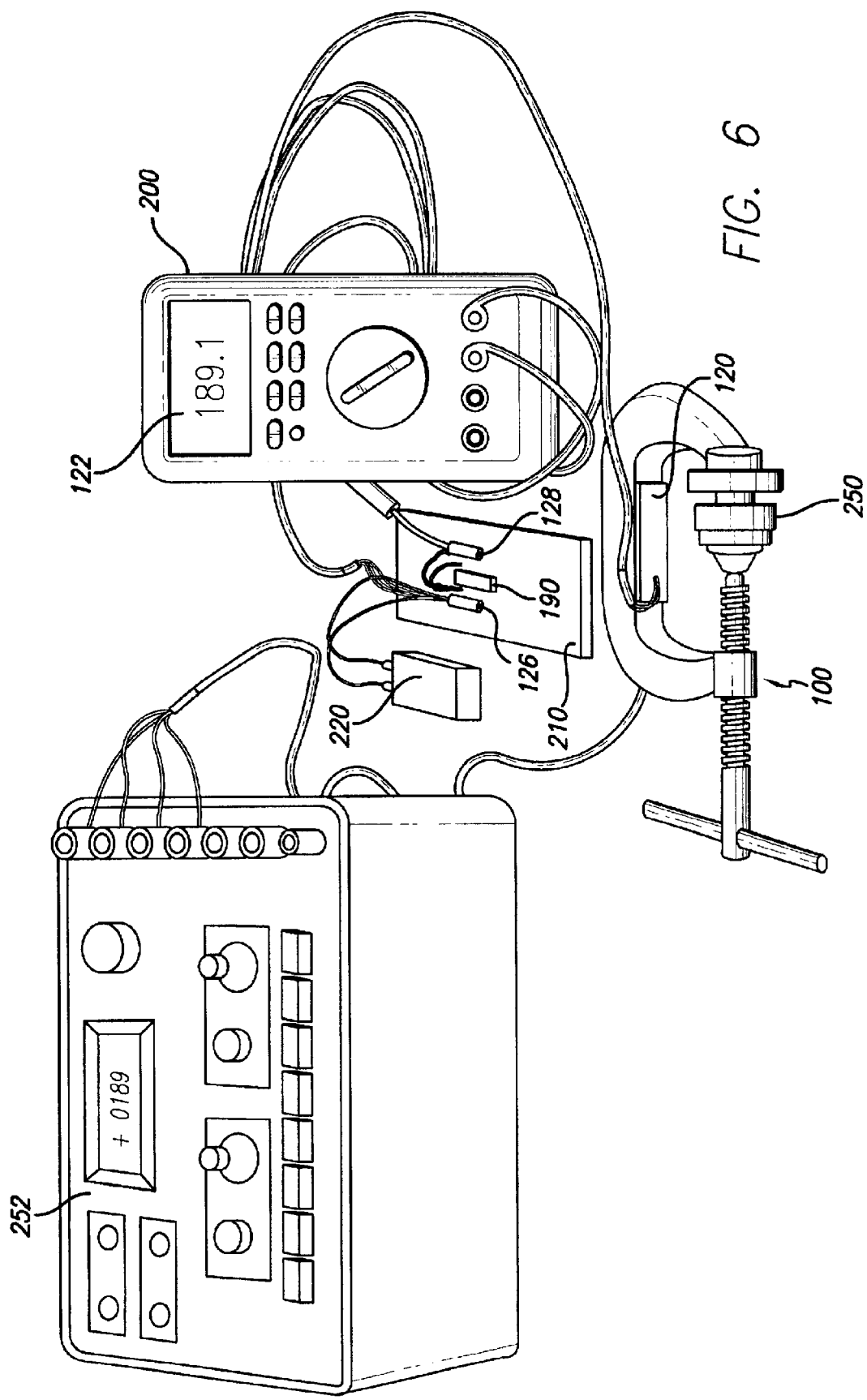
FIG. 6 is a plan view of a bench model test system for the present invention showing calibration for a load.

As shown in FIGS. 5 and 6, a full bridge strain gage circuit 120 is installed on the clamp 100 and has span 126 and zero 128 circuits with the output fed into a digital display 122 (in the form of voltmeter 200). The design is simple, compact, and practical for many applications. The strain gages 120 may be installed with Measurements Group M-Bond 610 or AE-10 or other effective adhesives. Alternatively, the strain gages 120 may be integrated into the chassis 102 of the clamp 100 per FIGS. 1 and 2.

Inter-bridge wiring (34 AWG) can be used to wire the strain gages to a terminal strip. The same inter-bridge wiring may be used to wire the terminal strip to a printed circuit board 210. The printed circuit board 210 contains the voltage regulation 190, span 126, and zero 128 circuits, and the power switch 180. The output of the printed circuit board 210 is fed into the digital display 122, which plugs into the printed circuit board 210, and is controlled by the zero 128 and span 126 circuits. The power is supplied by a 9V battery 220 or two coin cells (to minimize the size, not shown), which is wired to the printed circuit board 210 and the digital display 122.

The force-measuring clamp 100 must be calibrated prior to use. Calibration can be in any force-related engineering units (i.e. lbs., kg, etc.). The span potentiometer 126 is used in the calibration process only while the zero potentiometer 128 is used in both the calibration process and during normal operation. To operate the device, the power is switched on, the display is zeroed if needed, and a clamping force applied to any part(s) and the display read.

Some alternate or future embodiments may include the use of smaller batteries such as coin cells or watch batteries to make the unit more compact, the use of a smaller digital panel display and with more options, special packaging of all components, and the use of this technique on other force devices.

Since σ(stress)=ε(strain)*E(modulus) and σ(stress)=P(force)/A(area), then P/A=εE. Hence P=εEA. Therefore, there is a proportional relationship between force and strain. On the force-measuring clamp, the strain is measured with four strain gages comprising a Wheatstone bridge. The bridge output is fed into the zero and span circuitry and then fed into the digital panel display. With the span and zero circuitry, the output can be calibrated to indicate any force related engineering units (i.e. lbs., kg, etc.).

The strain gages 120 that measure the force are preferably low current draw gages to preserve the battery life, therefore, one thousand ohm (1000Ω) gages are preferred. If one thousand ohm (1000Ω) gages are not available, three hundred fifty ohm (350Ω) gages are contemplated as being the next best choice. The size of the gages is also significant. Sizes 1/16" to 1/8" are preferred depending on the size of the clamp. Sizes less than 1/16" (0.062" to 0.125") are not recommended. The circuitry for span and zero functions needs to be designed and constructed for instrumentation use having high stability and low noise. No peripheral equipment is needed for this device. Preferably, it is self-contained as shown in FIG. 1.

Generally, the only maintenance the device needs is an occasional battery change and calibration. A low battery indication can be included on the display as an option. The force-measuring clamp 100 set forth herein is extremely reliable, providing greater utility for it.

Some of the unique features of the force-measuring clamp are as follows. The measurement of force, the signal conditioning, and the display of force are all completed right on the device applying the force. The device is a 'dual purpose' device by means of both applying the force and indicating it. Consequently, the device serves as a loading mechanism, sensor, signal conditioner, power source, and display all in one advantageous package.

Additionally, the advantages of the device arise from being able to apply the desired or recommended clamping pressure or force with precision and ease. No external or peripheral equipment is needed to display the force readings as they are already present in the clamp itself. Delicate parts can be used with this device with a high degree of confidence.

In one experiment or trial and as indicated in FIG. 6, data was taken in a laboratory using a "bread board" design. This concept was successfully implemented on or about Sep. 30, 1999 at or near the Flight Loads Laboratory of the NASA Dryden Flight Research Center in Edwards, Calif. by use in combination of certified weights, a load washer 250, a strain indicator 252, a voltmeter, and the force-measuring clamp itself. First, a load washer 250 was connected to the strain indicator 252 (a separate component from the strain gage 120) and the components of the force-measuring clamp 100 were connected together using a voltmeter 200 to measure the output. Second, the load washer 250 was calibrated using the certified weights for load, and the strain indicator 252 to monitor and adjust the output of the load washer 250 to indicate pounds (lbs.).

Third, the force-measuring clamp 100 was zeroed under no load and then used to apply a load of one hundred fifty pounds (150 lbs.) to the load washer 250. Fourth, the span potentiometer within the span circuitry 126 was adjusted so that the output indication on the voltmeter 200 for the force-measuring clamp 100 read the same as the indication on the strain indicator 252, one hundred fifty pounds (150 lbs.). Fifth, the force of the force-measuring clamp 100 was varied to many different loads and the outputs on both the strain indicator 252 and the voltmeter 200 were monitored. The outputs matched extremely well and were repeatable. The last step was to see how well the outputs matched after a period of time. A force of 100 lbs. was applied and left at that load for 2½ hours. The outputs remained the same for the entire time and did not drift, even by as much as one pound (1 lb.) This experiment showed that the force-measuring clamp works well and can be an effective tool for industry.

In FIG. 6, a force of one hundred eighty nine point one pounds (189.1 lbs.) is being applied by die clamp 100 to a load washer 250. In FIG. 5, the zero point is being calibrated.

The capabilities of this device are wide in scope yet within the scope of the usefulness of a clamp. Almost any magnitude of force can be measured, subject almost only to the strength of the underlying clamp. Linearity, resolution, and repeatability are subjects to be explored in the near future.

There are many processes and products that can benefit from the force-measuring clamp. These include: adhesive, transducer, instrumentation, and mechanical industries, as well as other industries.

While the present invention has been described with regards to particular embodiments, it is recognized that additional variations of the present invention may be devised without departing from the inventive concept.

What is claimed is:

1. A calibratable force-measuring and force-applying clamp, comprising:
   an adjustable clamp, said adjustable clamp adjustably applying force to a workpiece object;
   a strain gage coupled to said adjustable clamp and detecting elastic deformation in said adjustable clamp when said adjustable clamp applies force to said workpiece object, said strain gage transmitting a strain signal;
   a data acquisition circuit coupled to said strain gage and receiving said strain signal, said data acquisition circuit transmitting a data signal and having a span circuit and a zero circuit; and
   a display coupled to said data acquisition circuit, said display receiving said data signal and displaying symbols characterizing an amount of force applied to said workpiece object by said adjustable clamp; whereby
   force applied by said adjustable clamp to said workpiece object may be calibrated for a zero point and a load point to enable precise and accurate determination of applied force.

2. A calibratable force-measuring and force-applying clamp as set forth in claim 1, wherein said adjustable clamp incorporates said strain gage, said data acquisition circuit, and said display.

3. A calibratable force-measuring and force-applying clamp as set forth in claim 1, wherein said strain gage further comprises a full bridge strain gage.

4. A calibratable force-measuring and force-applying clamp as set forth in claim 1, wherein said data acquisition circuit further comprises:
   an amplifier; and
   a voltage reference source, said voltage reference source coupled to said amplifier via said strain gage.

5. A calibratable force-measuring and force-applying clamp as set forth in claim 4, wherein said data acquisition circuit further comprises:
   a monolithic chip incorporating both said amplifier and said voltage reference source.

6. A calibratable force-measuring and force-applying clamp as set forth in claim 4, wherein said span circuit is coupled to and controls gain of said amplifier.

7. A calibratable force-measuring and force-applying clamp as set forth in claim 6, wherein said span circuit is a potentiometer coupled across inputs to said amplifier.

8. A calibratable force-measuring and force-applying clamp as set forth in claim 4, wherein said zero circuit is coupled to and affects output of said voltage reference source.

9. A calibratable force-measuring and force-applying clamp as set forth in claim 8, wherein said zero circuit is a potentiometer coupled across connections to said voltage reference source.

10. A calibratable force-measuring and force-applying clamp as set forth in claim 9, wherein a wiper of said zero circuit coupled to said strain signal.

11. A calibratable force-measuring-and force-applying clamp, comprising:
    an adjustable clamp, said adjustable clamp adjustably applying force to a workpiece object;
    a strain gage coupled to said adjustable clamp, said strain gage including a full bridge strain gage and detecting elastic deformation in said adjustable clamp when said adjustable clamp applies force to said workpiece object, said strain gage transmitting a strain signal;
    a data acquisition circuit having a span circuit and a zero circuit and including an amplifier and a voltage reference source incorporated into a monolithic chip, said amplifier coupled to said voltage reference source via said strain gage, said data acquisition circuit coupled to said strain gage and receiving said strain signal, said amplifier transmitting a data signal;
    said span circuit being a first potentiometer coupled across inputs to said amplifier and controlling gain of said amplifier;
    said zero, circuit being a second potentiometer coupled across connections to said voltage reference source, a wiper of said zero circuit coupled to said strain signal, said zero circuit affecting output of said strain signal;
    a display coupled to said data acquisition circuit, said display receiving said data signal and displaying symbols, characterizing an amount of force applied to said workpiece object by said adjustable clamp; and
    said adjustable clamp incorporating said strain gage, said data acquisition circuit, and said display; whereby
    force applied by said adjustable clamp to said workpiece object may be precisely and accurately determined by inspection of said display.

12. A force-measuring and force-applying clamp, comprising:
    an adjustable clamp, said adjustable clamp adjustably applying force to a workpiece object;
    a strain gage coupled to said adjustable clamp and detecting elastic deformation in said adjustable clamp when said adjustable clamp applies force to said workpiece object, said strain gage transmitting a strain signal;
    data acquisition circuit having an amplifier coupled to a voltage reference source across said strain gage, said data acquisition circuit receiving said strain signal, said data acquisition circuit transmitting a data signal; and
    a display coupled to said data acquisition circuit, said display receiving said data signal and displaying symbols characterizing an amount of force applied to said workpiece object by said adjustable clamp; whereby force applied by said adjustable clamp to said workpiece object may be precisely and accurately determined.

13. A calibratable force-measuring and force-applying clamp as set forth in claim 12, wherein said data acquisition circuit has a span circuit and a zero circuit, said span circuit coupled to said amplifier and said zero circuit coupled to said voltage reference source.

14. A calibratable force-measuring and force-applying clamp as set forth in claim 12, wherein said adjustable clamp incorporates said strain gage, said data acquisition circuit, and said display.

15. A calibratable force-measuring and force-applying clamp as set forth in claim 12, wherein said strain gage further comprises a full bridge strain gage.

16. A calibratable force-measuring and force-applying clamp as set forth in claim 12, wherein said data acquisition circuit further comprises:

a monolithic chip incorporating both said amplifier and said voltage reference source.

17. A calibratable force-measuring and force-applying clamp as set forth in claim 13, wherein said span circuit controls gain of said amplifier.

18. A calibratable force-measuring and force-applying clamp as set forth in claim 17, wherein said span circuit is a potentiometer coupled across inputs to said amplifier.

19. A calibratable force-measuring and force-applying clamp as set forth in claim 13, wherein said zero circuit affects output of said voltage reference source.

20. A calibratable force-measuring and force-applying clamp as set forth in claim 19, wherein said zero circuit is a potentiometer coupled across connections to said voltage reference source.

21. A calibratable force-measuring and force-applying clamp as set forth in claim 20, wherein a wiper of said zero circuit coupled to said strain signal.

\* \* \* \* \*